United States Patent
Nagata

(10) Patent No.: US 9,567,448 B2
(45) Date of Patent: *Feb. 14, 2017

(54) VIBRATION-DAMPING RUBBER COMPOSITION, CROSSLINKED VIBRATION-DAMPING RUBBER COMPOSITION, AND VIBRATION-DAMPING RUBBER

(71) Applicant: BRIDGESTONE CORPORATION, Chuo-ku, Tokyo (JP)

(72) Inventor: Takeshi Nagata, Kamakura (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 14/375,159

(22) PCT Filed: Jan. 30, 2013

(86) PCT No.: PCT/JP2013/000486
§ 371 (c)(1),
(2) Date: Jul. 29, 2014

(87) PCT Pub. No.: WO2013/114869
PCT Pub. Date: Aug. 8, 2013

(65) Prior Publication Data
US 2015/0001434 A1    Jan. 1, 2015

(30) Foreign Application Priority Data
Jan. 30, 2012    (JP) .................................. 2012-017129

(51) Int. Cl.
| | | |
|---|---|---|
| *C08K 3/06* | (2006.01) | |
| *C08L 53/00* | (2006.01) | |
| *C08L 21/00* | (2006.01) | |
| *C08L 23/16* | (2006.01) | |
| *C08K 5/3415* | (2006.01) | |
| *C08F 297/08* | (2006.01) | |
| *C08L 23/20* | (2006.01) | |
| *C08L 23/04* | (2006.01) | |
| *C08L 7/00* | (2006.01) | |

(52) U.S. Cl.
CPC .............. *C08K 3/06* (2013.01); *C08F 297/08* (2013.01); *C08K 5/3415* (2013.01); *C08L 7/00* (2013.01); *C08L 21/00* (2013.01); *C08L 23/04* (2013.01); *C08L 23/16* (2013.01); *C08L 23/20* (2013.01); *C08L 53/00* (2013.01)

(58) Field of Classification Search
CPC ........ C08K 3/06; C08K 5/3415; C08F 297/08; C08L 53/00; C08L 21/00; C08L 23/16; C08L 23/20; C08L 23/04; C08L 7/00
USPC ........................................................ 524/105
See application file for complete search history.

(56) References Cited

U.S. PATENT DOCUMENTS

| | | | |
|---|---|---|---|
| 4,808,561 A | 2/1989 | Welborn, Jr. | |
| 4,933,385 A * | 6/1990 | Yamamoto ............ | C08K 5/0091 152/548 |
| 6,288,191 B1 * | 9/2001 | Nishiyama ............ | C08F 210/02 526/132 |
| 9,238,730 B2 * | 1/2016 | Yamamoto ............... | C08K 3/06 |
| 2002/0019478 A1 | 2/2002 | Ohyama et al. | |
| 2005/0124766 A1 | 6/2005 | Kimura et al. | |
| 2005/0221039 A1 | 10/2005 | Dunlap et al. | |
| 2005/0239639 A1 | 10/2005 | Monteil et al. | |
| 2006/0217468 A1 | 9/2006 | Kimura et al. | |
| 2006/0217493 A1 | 9/2006 | Kimura et al. | |

FOREIGN PATENT DOCUMENTS

| | | |
|---|---|---|
| CN | 1644611 A | 7/2005 |
| CN | 1840573 A | 10/2006 |
| CN | 1840574 A | 10/2006 |
| CN | 1934182 A | 3/2007 |
| CN | 1986624 A | 6/2007 |
| CN | 101142268 A | 3/2008 |
| CN | 101274973 A | 10/2008 |
| EP | 0526955 A1 | 2/1993 |
| JP | 61238501 A * | 10/1986 |
| JP | 63-241045 A | 10/1988 |
| JP | 1-501633 A | 6/1989 |
| JP | 2-28230 A | 1/1990 |
| JP | 2-68937 A | 3/1990 |

(Continued)

OTHER PUBLICATIONS

International Search Report for PCT/JP2013/000486 dated Mar. 26, 2013.

(Continued)

*Primary Examiner* — Angela C Scott
(74) *Attorney, Agent, or Firm* — Sughrue Mion, PLLC

(57) ABSTRACT

Provided is a vibration-insulating rubber composition and a crosslinked vibration-insulating rubber composition which successfully maintain basic physical properties and thermal resistance while being excellent in weather resistance and crack growth resistance, and a vibration-insulating rubber using the vibration-insulating rubber composition and the crosslinked vibration-insulating rubber composition. The vibration-insulating rubber composition of the present invention includes: a rubber component having a conjugated diene compound/non-conjugated olefin copolymer; sulfur by 0.6 parts by mass or less per 100 parts by mass of the rubber component; and a bismaleimide compound by 1 to 5 parts by mass per 100 parts by mass of the rubber component.

15 Claims, No Drawings

(56) References Cited

FOREIGN PATENT DOCUMENTS

| | | | |
|---|---|---|---|
| JP | 02067342 A | * | 3/1990 |
| JP | 3-258840 A | | 11/1991 |
| JP | 2897836 B2 | | 5/1999 |
| JP | 2002187987 A | | 7/2002 |
| JP | 2006-199792 A | | 8/2006 |
| JP | 2006-273941 A | | 10/2006 |
| JP | 2008-7546 A | | 1/2008 |
| JP | 2008-280384 A | | 11/2008 |
| JP | 2010-95682 A | | 4/2010 |
| JP | 2010-106202 A | | 5/2010 |
| JP | 2010-254872 A | | 11/2010 |
| JP | 2011-46795 A | | 3/2011 |
| JP | 2011-148935 A | | 8/2011 |
| WO | 2012/105258 A1 | | 8/2012 |

OTHER PUBLICATIONS

Communication dated Jun. 1, 2015 from the State Intellectual Property Office of the P.R.C. in counterpart application No. 201380017229.X.
Communication dated Oct. 8, 2015 from the European Patent Office issued in corresponding application No. 13743352.0.

* cited by examiner

VIBRATION-DAMPING RUBBER COMPOSITION, CROSSLINKED VIBRATION-DAMPING RUBBER COMPOSITION, AND VIBRATION-DAMPING RUBBER

CROSS REFERENCE TO RELATED APPLICATIONS

This application is a National Stage of International Application No. PCT/JP2013/000486 filed Jan. 30, 2013, claiming priority based on Japanese Patent Application No. 2012-017129 filed Jan. 30, 2012, the contents of all of which are incorporated herein by reference in their entirety.

TECHNICAL FIELD

The present invention relates to a vibration-damping rubber composition, a crosslinked vibration-damping rubber composition, and vibration-damping rubber (which are each hereinafter also referred to as vibration-insulating rubber composition, crosslinked vibration-insulating rubber composition, and vibration-insulating rubber, respectively). In particular, the present invention relates to a vibration-insulating rubber composition and a crosslinked vibration-insulating rubber composition which successfully maintain basic physical properties and thermal resistance while being excellent in weather resistance and crack growth resistance, and also to a vibration-insulating rubber using the vibration-insulating rubber composition and the crosslinked vibration-insulating rubber composition.

BACKGROUND ART

In automobiles and various vehicles, a vibration-insulating rubber is used as a material constituting the torsional damper, the engine mount, and the muffler hanger so as to absorb vibrations occurring when driving an engine, to thereby suppress noise. Such vibration-insulating rubbers for use in vehicles are required to have a vibration-insulating function of suppressing, by absorbing, vibrations of heavy load supported by the rubber, and strength properties capable of supporting heavy load.

Further, when used under a high temperature environment such as in an engine room, the rubber is also required to have high durability and settling resistance, not to mention being excellent in strength properties and vibration-insulating properties while having a low dynamic-to-static modulus ratio.

In particular, the temperature of an engine room tends to be increased in recent years along with high output of engine and reduction in engine room space due to increase in vehicle interior space, with the result that the rubber is often used in a severer environment. Therefore, there are strict requirements for the vibration-insulating rubber for use in automobiles regarding, for example, thermal resistance.

In general, to improve rubber in thermal resistance and settling resistance, it is effective to reduce the content of sulfur. However, the reduced content of sulfur deteriorates durability. To overcome such problems, for example, Patent Literature 1 discloses a technology of providing a rubber composition containing a low content of sulfur and zinc acrylate (ZAA). The technology of adding zinc acrylate (ZAA) or zinc methacrylate (ZMA) is also disclosed in Patent Literatures 2 and 3.

However, a vibration-insulating rubber to be obtained by the aforementioned technology is high in dynamic-to-static modulus ratio, and still far from satisfactory in terms of all aspects including thermal resistance, durability, and settling resistance. Thus, there has been a room for improvement in compounding of the rubber.

Meanwhile, Patent Literature 4 or corresponding Patent Literature 5 discloses a technology of using a rubber composition containing, as a crosslinking agent, bismaleimide having a specific chemical structure and sulfur, to thereby improve thermal resistance and a low dynamic-to-static modulus ratio.

CITATION LIST

Patent Literature

PTL 1: JP 2008-7546 A
PTL 2: JP S63-241045 A
PTL 3: JP H02-28230 A
PTL 4: JP H3-258840 A
PTL 5: JP 2897836 B

SUMMARY OF INVENTION

Technical Problem

However, regarding the vibration-insulating rubber obtained by the technology of Cited Document 5, further improvements have been expected in terms of weather resistance and crack growth resistance.

Accordingly, the present invention has been made to solve the aforementioned problems, and specifically has an object to provide a vibration-insulating rubber composition and a crosslinked vibration-insulating rubber composition which are optimized in chemical components to thereby successfully maintain basic physical properties, such as hardness and elasticity, and thermal resistance while being excellent in weather resistance and crack growth resistance, and also to provide a vibration-insulating rubber using the vibration-insulating rubber composition and the crosslinked vibration-insulating rubber composition.

Solution to Problem

As a result of keen study for solving the aforementioned problems, the inventors of the present invention have found the followings, and achieved the present invention. That is, the vibration-insulating rubber composition may contain a specific amount of sulfur as a crosslinking agent and a bismaleimide compound as a crosslinking agent, so as to improve basic physical properties and thermal resistance of the rubber composition, and further, a conjugated diene compound/non-conjugated olefin copolymer may be contained in the rubber component so as to improve the resulting rubber composition in weather resistance and in crack growth resistance, with the result that the aforementioned problems can be solved.

The present invention has been made based on the aforementioned findings, and the primary features thereof are as follows:

(1) A vibration-insulating rubber composition, including: a rubber component having a conjugated diene compound/non-conjugated olefin copolymer; sulfur by 0.6 parts by mass or less per 100 parts by mass of the rubber component; and a bismaleimide compound by 1 to 5 parts by mass per 100 parts by mass of the rubber component.

(2) The vibration-insulating rubber composition according to the aforementioned aspect (1), in which the rubber component contains a conjugated diene-based polymer.

(3) The vibration-insulating rubber composition according to the aforementioned aspect (1), in which the conjugated diene compound/non-conjugated olefin copolymer contains a moiety derived from a conjugated diene compound by 30 mol % to 80 mol %.

(4) The vibration-insulating rubber composition according to the aforementioned aspect (1) or (2), in which the conjugated diene compound/non-conjugated olefin copolymer has a cis-1,4 bond content of 50% or more in a moiety derived from a conjugated diene compound.

(5) The vibration-insulating rubber composition according to the aforementioned aspect (1), in which the conjugated diene compound/non-conjugated olefin copolymer has a polystyrene equivalent weight-average molecular weight of 10,000 to 10,000,000.

(6) The vibration-insulating rubber composition according to the aforementioned aspect (1), in which the conjugated diene compound/non-conjugated olefin copolymer has a molecular weight distribution (Mw/Mn) of 10 or less.

(7) The vibration-insulating rubber composition according to the aforementioned aspect (1), in which the conjugated diene compound/non-conjugated olefin copolymer is contained by 10 to 100 parts by mass per 100 parts by mass of the rubber component.

(8) The vibration-insulating rubber composition according to the aforementioned aspect (1), in which the non-conjugated olefin is acyclic olefin.

(9) The vibration-insulating rubber composition according to the aforementioned aspect (1), in which the non-conjugated olefin has 2 to 10 carbon atoms.

(10) The vibration-insulating rubber composition according to the aforementioned aspect (8) or (9), in which the non-conjugated olefin is at least one selected from a group consisting of ethylene, propylene, and 1-butene.

(11) The vibration-insulating rubber composition according to the aforementioned aspect (10), in which the non-conjugated olefin is ethylene.

(12) The vibration-insulating rubber composition according to the aforementioned aspect (1), in which the conjugated diene-based polymer has natural rubber.

(13) A crosslinked vibration-insulating rubber composition obtained by crosslinking the vibration-insulating rubber composition according to the aforementioned aspect (1).

(14) A vibration-insulating rubber that uses the vibration-insulating rubber composition according to the aforementioned aspect (1) or the crosslinked vibration-insulating rubber composition according to the aforementioned aspect (13).

Advantageous Effect of Invention

According to the present invention, there may be provided a vibration-insulating rubber composition and a crosslinked vibration-insulating rubber composition which successfully maintain basic physical properties and thermal resistance while being excellent in weather resistance and crack growth resistance, and also a vibration-insulating rubber using the vibration-insulating rubber composition and the crosslinked vibration-insulating rubber composition.

DESCRIPTION OF EMBODIMENTS

<Vibration-Insulating Rubber Composition>
The vibration-insulating rubber composition according to the present invention contains: a rubber component composed of a conjugated diene compound/non-conjugated olefin copolymer; sulfur in an amount of 0.6 parts by mass or less per 100 parts by mass of the rubber component; and a bismaleimide compound in an amount of 1 to 5 parts by mass per 100 parts by mass of the rubber component.

(Rubber Component)
The rubber component constituting the vibration-insulating rubber composition of the present invention has a conjugated diene compound/non-conjugated olefin copolymer.

Conjugated Diene Compound/Non-Conjugated Olefin Copolymer

The conjugated diene compound/non-conjugated olefin copolymer is high in compatibility with other conjugated diene based polymers in the rubber component, so as to form a chemical structure with less double bonds and to obtain elongation crystallinity, which contributes to excellent weather resistance and crack growth resistance in the resulting rubber composition.

Here, the conjugated diene compound/non-conjugated olefin copolymer refers to a copolymer composed of a conjugated diene compound and non-conjugated olefin, which contains non-conjugated olefin as a monomer unit component in the copolymer.

The content of a moiety derived from the conjugated diene compound is not specifically limited and may be selected as appropriate depending on the intended use, which is preferably be 30 mol % to 80 mol % for the following reasons.

That is, when the content of a moiety derived from a conjugated diene compound in the conjugated diene compound/non-conjugated olefin copolymer is 30 mol % or more, sufficient processability can be ensured, while the content of 80 mol % or less increases the ratio of non-conjugated olefin to improve weather resistance.

Meanwhile, the content of a moiety derived from non-conjugated olefin in the conjugated diene compound/non-conjugated olefin copolymer is not specifically limited and may be selected as appropriate depending on the intended use.

For example, with the objective of ensuring weather resistance and crack growth resistance, the content of a moiety derived from non-conjugated olefin may preferably in a range of 20 mol % to 70 mol % for the following reasons. When the content of a moiety derived from non-conjugated olefin in the conjugated diene compound/non-conjugated olefin copolymer is 20 mol % or more, weather resistance can be improved. The content of 70 mol % or less is capable of maintaining compatibility with other conjugated diene based polymers in the rubber component, to thereby improve weather resistance and crack growth resistance.

The cis-1,4 bond content in the moiety derived from the conjugated diene compound in the conjugated diene compound/non-conjugated olefin copolymer is not particularly limited and may be selected depending on the intended use. However, the cis-1,4 bond content may preferably be 50% or more.

When the moiety derived from the conjugated diene compound has a cis-1,4 bond content of 50% or more, it is possible to maintain low glass transition temperature (Tg), which can improve physical properties such as crack growth resistance and wear resistance. Further, the amount of cis-1,4 bonds in the moiety derived from the conjugated diene compound may be more than 92%, to thereby allow for improvement in crack growth resistance, weather resistance, and thermal resistance; the amount may be 95% or more to make further improvement in crack growth resistance, weather resistance, and thermal resistance.

It should be noted that the amount of cis-1,4 bonds refers to the amount in the moiety derived from the conjugated diene compound, and should not be construed as the ratio relative to the entire copolymer.

Meanwhile, the non-conjugated olefin used as a monomer in the conjugated diene compound/non-conjugated olefin copolymer refers to non-conjugated olefin other than the conjugated diene compound, and the use of the non-conjugated olefin allows for imparting excellent thermal resistance, reducing the ratio of double bonds in the main chain of the copolymer, and lowering crystallinity to improve the degree of freedom in design as an elastomer. Further, acyclic olefin is preferred as the non-conjugated olefin. Furthermore, the non-conjugated olefin preferably has 2 to 10 carbon atoms.

Therefore, preferred examples of the non-conjugated olefin includes α-olefin such as: ethylene; propylene; 1-butene; 1-pentene; 1-hexene; 1-heptene; and 1-octene, with ethylene, propylene, and 1-butene being more preferred, and ethylene being particularly preferred. Here, the non-conjugated olefin does not include styrene. The α-olefin has a double bond at the α position of olefin, and thus can be efficiently copolymerized with conjugated diene. The aforementioned examples of the non-conjugated olefin may be used alone or in combination of two or more kinds thereof. Here, olefin refers to a compound containing an aliphatic unsaturated hydrocarbon having one or more carbon-carbon double bonds.

Further, the copolymer exhibits static crystallinity when including a block moiety composed of monomer units of non-conjugated olefin, and thus exhibits excellent mechanical properties such as breaking strength.

It should be noted that the conjugated diene compound used as a monomer in the conjugated diene compound/non-conjugated olefin copolymer may preferably has 4 to 12 carbon atoms. Specific examples of the conjugated diene compound may include: 1,3-butadiene, isoprene, 1,3-pentadiene, and 2,3-dimethylbutadiene, with 1,3-butadiene and isoprene being preferred. The aforementioned examples of the conjugated diene compound may be used alone or in combination of two or more kinds thereof.

It should be noted that any of the aforementioned specific examples of the conjugated diene compound may similarly be used to prepare the copolymer of the present invention by the same mechanism.

The conjugated diene compound/non-conjugated olefin copolymer may have a weight-average molecular weight (Mw) which is not particularly limited. In the light of application to a polymer matrix material, the copolymer preferably has a weight-average molecular weight (Mw) in terms of polystyrene of 10,000 to 10,000,000, and more preferably of 10,000 to 1,000,000, and particularly preferably of 50,000 to 600,000. The Mw exceeding 10,000,000 leads to a fear of deterioration in molding processability.

Further, the conjugated diene compound/non-conjugated olefin copolymer may preferably has a molecular weight distribution (Mw/Mn) of 10 or less, and more preferably of 6 or less, the molecular weight distribution being represented as a ratio of the weight-average molecular weight (Mw) and the number-average molecular weight (Mn). Otherwise, the molecular weight distribution exceeding 10 makes the physical properties non-homogeneous.

Here, the weight-average molecular weight and the molecular weight distribution may be obtained by gel permeation chromatography (GPC) using polystyrene as a standard.

The content of 1,2 adduct moieties (including 3,4 adduct moieties) of the conjugated diene compound in the moiety derived from the conjugated diene compound in the conjugated diene compound/non-conjugated olefin copolymer is not particularly limited and may be selected as appropriate depending on the intended use, which is preferably 5% or less, more preferably 3% or less, and particularly preferably 2.5% or less.

When the content of 1,2 adduct moieties (including 3,4 adduct moieties) of the conjugated diene compound in the moiety derived from the conjugated diene compound in the conjugated diene compound/non-conjugated olefin copolymer is defined to be 5% or less, the copolymer may further be improved in weather resistance and ozone resistance. Meanwhile, when the content of 1,2 adduct moieties (including 3,4 adduct moieties) of the conjugated diene compound in the moiety derived from the conjugated diene compound in the conjugated diene compound/non-conjugated olefin copolymer is defined to be 2.5% or less, the copolymer may still further be improved in weather resistance and ozone resistance.

It should be noted that the content of 1,2 adduct moieties (including 3,4 adduct moieties) refers to the amount in the moiety derived from the conjugated diene compound, and should not be construed as the ratio relative to the entire copolymer. Further, the content of 1,2 adduct moieties (including 3,4 adduct moieties) of the conjugated diene compound in the moiety derived from the conjugated diene compound in the conjugated diene compound/non-conjugated olefin copolymer is equal to a 1,2-vinyl bond content when the conjugated diene compound is butadiene.

The conjugated diene compound/non-conjugated olefin copolymer may have a chain structure which is not particularly limited and may be selected as appropriate depending on the intended use. The conjugated diene compound/non-conjugated olefin copolymer may include, for example, a block copolymer, a random copolymer, a tapered copolymer, and an alternate copolymer.

Block Copolymer

The block copolymer has a structure including one of $(A-B)_x$, $A-(B-A)_x$, and $B-(A-B)_x$ (here, A represents a block moiety including monomer units of non-conjugated olefin, B represents a block moiety including monomer units of a conjugated diene compound, and x represents an integer of at least 1). Here, a block copolymer including a plurality of structures of (A–B) or of (B–A) is referred to as multi-block copolymer.

When the conjugated diene compound/non-conjugated olefin copolymer is structured as a block copolymer, the block moiety including monomers of non-conjugated olefin exhibits static crystallinity, and thus the copolymer exhibits excellent mechanical properties such as breaking strength.

Random Copolymer

When the conjugated diene compound/non-conjugated olefin copolymer is a random copolymer, the monomer units of the non-conjugated olefin is randomly arranged and thus the copolymer does not undergo phase separation, with the result that a crystallization temperature derived from a block moiety cannot be observed. In other words, it is possible to introduce non-conjugated olefin having a thermal resistance property or the like into the main chain of the copolymer, to thereby improve thermal resistance.

Tapered Copolymer

The tapered copolymer refers to a copolymer including both the random copolymer and the block copolymer, and is formed of: a block moiety (also referred to as block structure) of at least one of a block moiety including monomer units of a conjugated diene compound and a block moiety including monomer units of non-conjugated olefin; and a random moiety (also referred to as random structure) having randomly-arranged monomer units of a conjugated diene compound and of non-conjugated olefin.

The structure of the tapered copolymer has a continuous or discontinuous distribution of a composition including a conjugated diene compound component and a non-conjugated olefin component. Here, the non-conjugated olefin component preferably has a chain structure which includes many non-conjugated olefin block components of short chain (low molecular weight), without including not so many non-conjugated olefin block components of long chain (high molecular weight).

Alternating Copolymer

The alternating copolymer refers to a copolymer having a conjugated diene compound and non-conjugated olefin which are alternately arranged (a molecular chain structure of -ABABABAB— where A represents non-conjugated olefin and B represents a conjugated diene compound).

The alternating copolymer allows for attaining both flexibility and adhesiveness at the same time. The copolymer may preferably be at least one selected from the block copolymer and the tapered copolymer.

The content of the conjugated diene compound/non-conjugated olefin copolymer in 100 parts by mass of the rubber component may preferably 10 parts by mass to 100 parts by mass.

When the content of the conjugated diene compound/non-conjugated olefin copolymer is less than 10 parts by mass, a desired weather resistance and crack growth resistance may not be obtained.

Method of Manufacturing Conjugated Diene Compound/Non-Conjugated Olefin Copolymer Next, description is given of a method of manufacturing the aforementioned non-conjugated olefin-based copolymer. However, the manufacturing method described in detail below is merely illustrated as an example.

A method of manufacturing the non-conjugated olefin-based copolymer preferably include a step of polymerizing non-conjugated olefin and a conjugated diene compound in the presence of a first polymerization catalyst composition, a second polymerization catalyst composition, or a third polymerization catalyst composition described in below. Here, as the polymerization method, there may be employed an arbitrary method including solution polymerization, suspension polymerization, liquid phase bulk polymerization, emulsion polymerization, vapor phase polymerization, and solid phase polymerization. Further, in the case of using a solvent in the polymerization reaction, there may be used any solvent that is inert in the polymerization reaction, and examples thereof may include toluene, hexane, cyclohexane, and the mixture thereof.

First Polymerization Catalyst Composition

The aforementioned first polymerization catalyst composition (hereinafter, also referred to as 'first polymerization catalyst composition') is exemplified as a polymerization catalyst composition including at least one complex selected from a group consisting of: a metallocene complex represented the following general formula (I); a metallocene complex represented by the following general formula (II); and a half metallocene cation complex represented by the following general formula (III):

[Formula 1]

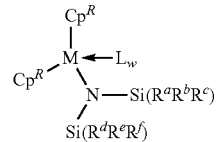

(I)

(in the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3);

[Formula 2]

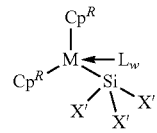

(II)

(in the formula (II), M represents a lanthanoid element, scandium, or yttrium; $Cp^R$ each independently represents an unsubstituted or substituted indenyl group; X' represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3); and

[Formula 3]

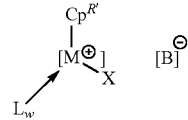

(III)

(in the formula (III), M represents a lanthanoid element, scandium, or yttrium; $Cp^{R'}$ each independently represents an unsubstituted or substituted cyclopentadienyl, indenyl, fluorenyl; X represents a hydrogen atom, a halogen atom, an alkoxy group, a thiolate group, an amide group, a silyl group, or a hydrocarbon group having 1 to 20 carbon atoms; L represents a neutral Lewis base; w represents an integer of 0 to 3; and [B]$^-$ represents a non-coordinating anion).

The first polymerization catalyst composition may further include another component such as a co-catalyst, which is contained in a general polymerization catalyst composition containing a metallocene complex. Here, the metallocene complex is a complex compound having one or more cyclopentadienyl groups or derivative cyclopentadienyl groups bonded to the central metal. In particular, a metallocene complex may be referred to as half metallocene complex when the number of cyclopentadienyl group or derivative thereof bonded to the central metal is one having one.

In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl, 2-methyl indenyl, and 1-methyl-2-phenyl indenyl group. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl, with the substituted or unsubstituted indenyl being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

[Formula 4]

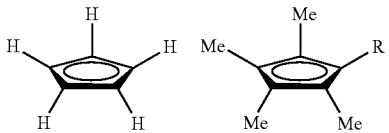

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—$N(SiR_3)_2$]. Groups represented by R($R^a$ to $R^f$ in the general formula (I)) in the silyl amide ligand each independently represent a hydrogen atom or an alkyl group having 1 to 3 carbon atoms, and it is preferred that at least one of $R^a$ to $R^f$ represents a hydrogen atom. With at least one of $R^a$ to $R^f$ representing a hydrogen atom, the catalyst can be synthesized with ease, and the height around silicon can be reduced, to thereby allow the non-conjugated olefin to be easily introduced. Based on the same objective, it is more preferred that at least one of $R^a$ to $R^c$ represents a hydrogen atom, and at least one of $R^d$ to $R^f$ represents a hydrogen atom. A methyl group is preferred as the alkyl group.

The metallocene complex represented by the general formula (II) includes a silyl ligand represented by [—$SiX'_3$]. X' in the silyl ligand represented by [—$SiX'_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxy group, a thiolate group, an amide group, a silyl group, and a hydrocarbon group having 1 to 20 carbon atoms. In the general formula (III), the alkoxy group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups (aromatic alkoxy groups) such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bis trialkylsilyl amide groups such as a bis trimethylsilyl amide group, with the bis trimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl (bistrimethylsilyl)silyl group, with the tris(trimethylsilyl) silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bis trimethylsilylmethyl group each containing a silicon atom, with the methyl group, the ethyl group, the isobutyl group, the trimethylsilylmethyl group, and the like being preferred.

In the general formula (III), the bis trimethylsilyl amide group and the hydrocarbon group having 1 to 20 carbon atoms are preferred as X.

In the general formula (III), examples of the non-coordinating anion represented by [B]⁻ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (I) to (II), and the half metallocene cation complex represented by the general formula (III) may be each present as a monomer or as a dimer or a multimer having more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (I) is described.

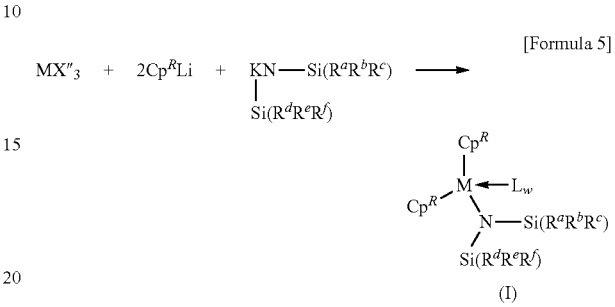

(In the formula (I), X″ represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (II) is described.

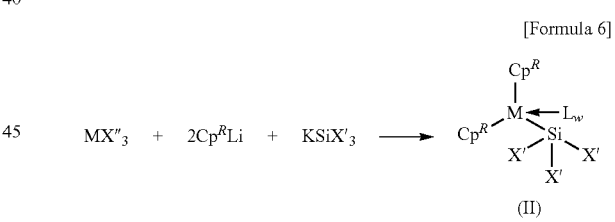

(In the formula (II), X″ represents a halide.)

The half metallocene cation complex represented by the general formula (III) can be obtained by, for example, the following reaction:

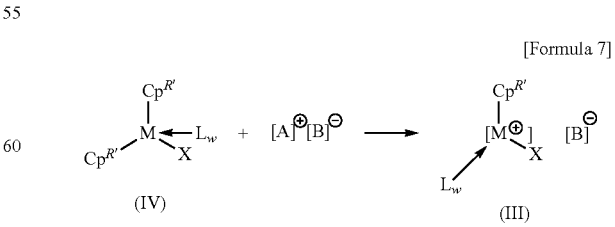

In a compound represented by the general formula (IV): M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation.

Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl) phosphonium cation, and a tri(dimethylphenyl)phosphonium cation. Of those cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl)borate and triphenylcarbonium tetrakis(pentafluorophenyl)borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methylaluminoxane (MAO) and modified methylaluminoxanes. In addition, preferred examples of the modified methyl aluminoxane include MMAO-3A (manufactured by Tosoh Finechem Corporation). The content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group of $C_1$ to $C_{10}$ or a hydrogen atom, and R" is a hydrocarbon group of $C_1$ to $C_{10}$). Examples of the organic aluminum compound include: trialkyl aluminum; a dialkyl aluminum chloride; an alkyl aluminum dichloride; and a dialkyl aluminum hydride, with the trialkyl aluminum being preferred. Further, examples of the trialkyl aluminum include triethyl aluminum and triisobutyl aluminum. A content of the organic aluminum compound in the first polymerization catalyst composition is preferably 1-fold mol to 50-fold mol and more preferably about 10-fold mol, with respect to the metallocene complex.

Further, in the first polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a polymer to be obtained.

Second Polymerization Catalyst Composition

Next, the aforementioned second polymerization catalyst composition (hereinafter, also referred to as 'second polymerization catalyst composition') is described.

A preferred example of the second polymerization catalyst composition may include:

a polymerization catalyst composition containing:

Component (A): a rare earth element compound or a reactant of a rare earth element compound and a Lewis base, with no bond formed between the rare earth element and carbon; and Component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen.

When the second polymerization catalyst composition contains at least one kind of the ionic compound (B-1) and the halogen compound (B-3), the polymerization catalyst composition further contains:

Component (C): an organic metal compound represented by the following general formula (X):

$$YR^1{}_aR^2{}_bR^3{}_c \qquad (X)$$

(In the formula (X), Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table).

The ionic compound (B-1) and the halogen compound (B-3) do not have carbon atoms to be fed to Component (A), and thus Component (C) becomes necessary as a source of feeding carbon to Component (A). Here, the polymerization catalyst composition still may include Component (C) even if the polymerization catalyst composition includes the aluminoxane (B-2). Further, the aforementioned second polymerization catalyst composition may further include another component such as a co-catalyst, which is contained in a general rare earth element compound-based polymerization catalyst composition.

In the polymerization system, the concentration of Component (A) contained in the second polymerization catalyst composition is preferably defined to fall within a range of 0.1 mol/L to 0.0001 mol/L.

Component (A) contained in the second polymerization catalyst composition is a rare earth element compound or a reactant of the rare earth element compound and a Lewis base. Here, a rare earth element compound or a reactant of the rare earth element compound and a Lewis base do not have a direct bond formed between the rare earth element and carbon. When the rare earth element compound or the reactant thereof does not have a direct bond formed between the rare earth element and carbon, the resulting compound is stable and easy to handle. Here, the rare earth element compound refers to a compound containing a lanthanoid element, scandium, or yttrium, the lanthanoid elements including elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. The aforementioned examples of Component (A) may be contained alone or in combination of two or more kinds thereof.

The rare earth element compound is preferably composed of a rare earth metal of a bivalent or trivalent salt or of a complex compound, and more preferably a rare earth element compound containing one or two kinds of ligands selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \quad \text{(XI)}$$

$$M^{11}X^{11}{}_3 \cdot L^{11}{}_w \quad \text{(XII).}$$

(In the formula (XI) or (XII), $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3.)

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropyl-phenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis trialkylsilyl amide groups such as a bis trimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid(butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl) phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(2-methylhexyl)(1-methylheptyl)phosphinic acid, an (2-ethylhexyl)

(p-nonylphenyl)phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more kinds thereof.

As to Component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

Component (B) contained in the second polymerization catalyst composition is at least one compound selected from a group consisting of: an ionic compound (B-1); an aluminoxane (B-2); and a halogen compound (B-3). The total content of Component (B) contained in the second polymerization catalyst composition is preferably defined to fall within a range of 0.1-fold mol to 50-fold mol, with respect to Component (A).

The ionic compound represented by (B-1) is formed of non-coordinating anion and cation, and an example thereof includes: an ionic compound that reacts with the rare earth element compound as Component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (triphenyl, pentafluorophenyl) borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri (dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more kinds thereof. The content of the ionic compound in the second polymerization catalyst composition is preferably 0.1-fold mol to 10-fold mol, and more preferably about 1-fold mol, with respect to Component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming Component (A).

The halogen compound represented by (B-3) includes at least one of: a Lewis acid; a complex compound of a metal halide and a Lewis base; and an organic compound containing active halogen, and is capable of reacting with, for example, the rare earth element compound as Component (A) or with the reactant resulting from the Lewis base and the rare earth element compound, so as to form a cationic transition metal compound, halogenated transition metal compound, and a compound with charge deficiency in the transition-metal center. The content of the halogen compound in the second polymerization catalyst composition is preferably 1-fold mol to 5-fold mol, with respect to Component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being more preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being more preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

Component (C) contained in the second polymerization catalyst composition is an organic compound represented by the general formula (X):

(in the formula (X), Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 of Group 12 of the periodic table, a, b, and c are all 1 when Y is a metal selected from Group 13 of the periodic table), and is preferably an organic aluminum compound represented by the general formula (Xa):

$$AlR^{11}R^{12}R^{13} \tag{Xa}$$

(in the formula (Xa), $R^{11}$ and $R^{12}$ are the same or different hydrocarbon groups each having 1 to 10 carbon atoms or a hydrogen atom; and $R^{13}$ is a hydrocarbon group having 1 to 10 carbon atoms, in which $R^{13}$ may be the same as or different from $R^{11}$ or $R^{12}$ above). Examples of the organic aluminum compound in the general formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic aluminum compounds as Component (C) may be contained alone or in combination of two or more. The content of the organic aluminum compound in the second polymerization catalyst composition is preferably 1-fold mol to 50-fold mol, and more preferably about 10-fold mol, with respect to Component (A).

Next, description is given of a structure and performance of a compound to be included, as a polymerization catalyst, in the second catalyst composition.

Examples of the polymerization catalyst include a metallocene-based composite catalyst for use in polymerization, which is represented by the following formula (A):

(in the formula (A), R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2).

A preferred example of the metallocene-based composite catalyst includes a metallocene-based composite catalyst represented by the following general formula (XV):

[Formula 8]

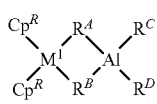

(XV)

(in the formula (XV), $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, the $R^A$ and $R^B$ being μ-coordinated with $M^1$ and Al; and $R^C$ and $R^D$ each independently represent a hydrocarbon group having 1 to 20 carbon atoms or a hydrogen atom).

A copolymer can be produced using these metallocene-based composite catalysts. Further, the use of these metallocene-based composite catalysts, such as an aluminum-based composite catalyst, for example, can reduce or eliminate the amount of alkyl aluminum to be used in the step of synthesizing a copolymer. Meanwhile, the use of a conventional catalyst system requires a large amount of alkyl aluminum to be used in synthesizing a copolymer. For example, a conventional catalyst system requires alkyl aluminum of at least 10 equivalents relative to a metal catalyst, whereas the metallocene-based composite compound of the present invention can exhibit an excellent catalytic effect through the addition of alkyl aluminum of only about 5 equivalents. The µ-coordination refers to a state of coordination which forms a crosslinked structure.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being µ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. Here, the µ-coordination refers to the coordination style taking a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV), the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Specific examples of the hydrocarbyl group suitably include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group, which is similar to the hydrocarbyl group described above. A specific example of the metalloid group is a trimethylsilyl group.

Specific examples of the substituted indenyl group include 2-phenyl indenyl and 2-methyl indenyl group. Two $Cp^R$ in the formula (XV) may be the same as or different from each other.

In the formula (XV), $R^A$ and $R^B$ each independently represent a hydrocarbon group having 1 to 20 carbon atoms, the $R^A$ and $R^B$ being µ-coordinated with $M^1$ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. Here, the µ-coordination refers to the coordination style taking a crosslinked structure.

In the formula (XV), $R^c$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^KR^LR^M$ in a solvent, a metallocene complex represented by the following formula (XVI):

[Formula 9]

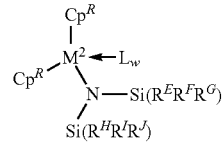

(XVI)

(in the formula (XVI), $M^2$ represents a lanthanoid element, scandium, or yttrium; $Cp^R$ each independently represents an unsubstituted or substituted indenyl group; $R^E$ to $R^J$ each independently represent a hydrogen atom or an alkyl group having 1 to 3 carbon atoms; L represents a neutral Lewis base; and w represents an integer of 0 to 3). The reaction may be carried out at temperatures around room temperature, and thus the metallocene-based composite catalyst can be manufactured under mild conditions. The reaction time is arbitrary, and may be about several hours to several tens of hours. The reaction solvent is not particularly limited, and any solvent including, for example, toluene and hexane, which are capable of dissolving the raw material and the product can be preferably used. The structure of the metallocene-based composite catalyst may preferably be determined by $^1$H-NMR or X-ray crystallography.

In the metallocene complex represented by the formula (XVI), $Cp^R$ represents an unsubstituted indenyl or substituted indenyl group, and is the same as $Cp^R$ defined in the formula (XV). Further, the metal represented by $M^2$ in the formula (XVI) is a lanthanoid element, scandium, or yttrium, and is the same as the metal represented by $M^1$ in the formula (XV).

The metallocene complex represented by the formula (XVI) includes a silyl amide ligand represented by [—N(SiR$_3$)$_2$]. Groups represented by R($R^E$ to $R^J$) in the silyl amide ligand each independently represent a hydrogen atom or an alkyl group having 1 to 3 carbon atoms, and it is preferred that at least one of $R^E$ to $R^J$ represents a hydrogen atom. With at least one of $R^E$ to $R^J$ representing a hydrogen atom, the catalyst can be synthesized with ease. Further, a methyl group is preferred as the alkyl group.

The metallocene complex represented by the general formula (XVI) further includes 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated on the complex, respective L may be the same as or different from each other.

The metallocene complex represented by the general formula (XVI) may be present as a monomer or as a dimer or a multimer having more monomers.

Meanwhile, the organic aluminum compound used for generating the metallocene-based composite catalyst is represented by $AlR^KR^LR^M$, where $R^K$ and $R^L$ each independently represent a monovalent hydrocarbon group having 1 to 20 carbon atoms or a hydrogen atom, and $R^M$ represents a monovalent hydrocarbon atom having 1 to 20 carbon atoms, in which $R^M$ may be the same or different from $R^K$ or $R^L$ above. Examples of the monovalent hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The content of the organic aluminum compound to be used for generating the metallocene-based composite catalyst is preferably 1-fold mol to 50-fold mol, and more preferably about 10-fold mol, with respect to the metallocene complex.

Third Polymerization Catalyst Composition

The aforementioned third polymerization catalyst composition (hereinafter, also referred to as 'third polymerization catalyst composition') is characterized by including the metallocene-based composite catalyst and boron anion, and preferably may further include another component such as a co-catalyst, which is contained in a general catalyst composition containing a metallocene-based catalyst. Here, the third polymerization catalyst composition is also referred to two-component catalyst, which has the metallocene-based composite catalyst and boron anion. The third polymerization catalyst composition further contains boron anion similarly to the metallocene-based composite catalyst, which allows the content of each monomer component in the copolymer to be arbitrarily controlled.

In the third polymerization catalyst composition, a specific example of the boron anion forming the two-component catalyst includes a tetravalent boron anion. Examples thereof may include: a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl), phenyl]borate, and a tridecahydride-7,8-dicarbaundecaborate, with the tetrakis(pentafluorophenyl) borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and more specifically, an example of the tri(substituted phenyl)carbonium cation includes a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

Here, in the third polymerization catalyst composition, the metallocene-based composite catalyst and the boron anion need to be used. However, the presence of the boron anion in the reaction system for reacting the metallocene catalyst represented by the formula (XVI) with an organic aluminum compound fails to synthesize the metallocene-based composite catalyst represented by the formula (XV). Therefore, in preparing the third polymerization catalyst composition, the metallocene-based composite catalyst needs to be synthesized in advance and the metallocene-based composite catalyst thus synthesized needs to be isolated and purified before being combined with boron anion.

Preferred examples of the co-catalyst that can be contained in the third polymerization catalyst composition may include an organic aluminum compound represented by the $AlR^KR^LR^M$, and also include aluminoxanes. The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). Those examples of the aluminoxane may be contained alone or in combination of two or more kinds thereof.

Polymerization Process

When using the polymerization catalyst or the polymerization catalyst composition described above in manufacturing the non-conjugated olefin-based copolymer to be contained in the rubber composition according to the present invention, the copolymer may be manufactured in a similar manner according to a conventional method of manufacturing a copolymer through polymerization reaction using the coordination ion polymerization catalyst. Here, in the case of carrying out the method of manufacturing the copolymer of the present invention using the polymerization catalyst composition, the method can be performed in either one of the following manners. That is, for example, (1) the components forming the polymerization catalyst composition may be separately provided in the polymerization reaction system including, as monomers, non-conjugated olefin and a conjugated diene compound, to thereby prepare the polymerization catalyst composition in the reaction system, or (2) the polymerization catalyst composition prepared in advance may be provided into the polymerization reaction system. Further, the method of (2) also includes providing the metallocene complex (active species) activated by the co-catalyst. The amount of the metallocene complex to be contained in the polymerization catalyst composition is preferably set to fall within a range of 0.0001-fold mol to 0.01-fold mol with respect to the total amount of the non-conjugated olefin and the conjugate diene compound.

Further, in the method of manufacturing the copolymer, a terminator such as ethanol and isopropanol may be used to stop the polymerization.

Further, the polymerization reaction may preferably be performed in an inert gas atmosphere, and preferably in nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10 MPa so as to allow a conjugated diene compound and non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

Further, in polymerizing non-conjugated olefin and a conjugated diene compound, the concentration of the conjugated diene compound (mol/L) and the concentration of the non-conjugated olefin (mol/L) at the start of copolymerization preferably satisfy the following relation:

the concentration of the non-conjugated olefin/the concentration of the conjugated diene compound ≥1.0; more preferably satisfy the following relation:

the concentration of the non-conjugated olefin/the concentration of the conjugated diene compound ≥1.3; and even more preferably satisfy the following relation:

the concentration of the non-conjugated olefin/the concentration of the conjugated diene compound ≥1.7.

The ratio of the concentration of the non-conjugated olefin to the concentration of the conjugated diene compound is defined to be at least 1, to thereby efficiently introduce the non-conjugated olefin into the reaction mixture.

Conjugated Diene-Based Polymer

The rubber component constituting the vibration-insulating rubber composition of the present invention may preferably include a conjugated diene-based polymer, as it can improve crack growth resistance.

The conjugated diene-based polymer refers to a copolymer (polymer) that does not include non-conjugated olefin as monomer unit component (part of the copolymer). Here, styrene is excluded from the non-conjugated olefin.

The type of the conjugated diene-based polymer is not particularly limited and may be selected as appropriate depending on the intended use. Examples thereof include: natural rubber (NR), various types of polybutadiene rubber (BR), synthesized polyisoprene rubber (IR), various types of styrene-butadiene copolymer rubber (SBR), ethylene-propylene rubber (EPR), styrene-isoprene copolymer rubber, isoprene-isoprene-butadiene copolymer rubber, isoprene-butadiene copolymer rubber, acrylonitrile-butadiene copolymer rubber (NBR), and polychloroprene. The aforementioned examples of the conjugated diene-based polymer may be used alone or in combination of two or more kinds thereof.

Of those, natural rubber (NR) is favorable as being high in compatibility with the conjugated diene compound/non-conjugated olefin copolymer, so as to further improve weather resistance and crack growth resistance.

(Sulfur)

The vibration-insulating rubber composition of the present invention contains sulfur in an amount of 0.6 parts by mass per 100 parts by mass of the rubber component. Sulfur serves as a vulcanizing agent in the rubber composition to thereby allow for improving strength.

The sulfur may preferably be contained in an amount of 0.6 parts by mass or less, preferably 0.4 parts by mass per 100 parts by mass of the rubber component. The sulfur content exceeding 0.6 parts by mass may deteriorates thermal resistance. In terms of ensuring the strength, the lower limit of the sulfur content may preferably be 0.2 parts by mass per 100 parts by mass of the rubber component.

(Bismaleimide Compound)

The vibration-insulating rubber composition of the present invention contains bismaleimide compounds each in an amount of 1 to 5 parts by mass per 100 parts by mass of the rubber component.

Bismaleimide compounds serve as co-crosslinking agents, and capable of developing a vulcanization reaction in the rubber when used in combination with the sulfur, to thereby suppress deterioration in basic physical properties of the vibration-insulating rubber.

Examples of the bismaleimide compound are not particularly limited and any of those publicly known may be used. According to the present invention, a bismaleimide compound represented by the following structural formula may suitably be adopted.

[Formula 10]

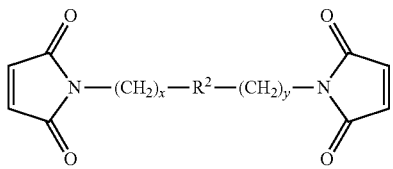

In the formula above, x and y each independently represent an integer of any of 0 to 20, and more preferably an integer of 0 to 10. Further, $R^2$ represents an aromatic group with 5 to 18 carbon atoms or an aromatic group including an alkyl group with 7 to 24 carbon atoms. Specifically, an aromatic group having the following configuration may be exemplified. In the structure illustrated in below, two atomic bonds are not illustrated. However, in the following structure, a bivalent group is formed by two atomic bonds from two carbon atoms arbitrarily selected.

[Formula 11]

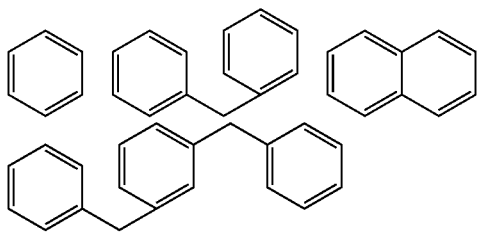

Specific examples of the bismaleimide compound represented by the structural formula above include: N,N'-o-phenylenebismaleimide, N,N'-m-phenylenebismaleimide, N,N'-p-phenylenebismaleimide, N,N'-(4,4'-diphenylmethane)bismaleimide, 2,2-bis-[4-(4-maleimidephenoxy)phenyl]propane, and bis(3-ethyl-5-methyl-4-maleimidephenyl)methane. In the present invention, N,N'-m-phenylenebismaleimide and N,N'-(4,4'-diphenylmethane)bismaleimide may be suitably used.

The aforementioned examples of the bismaleimide compound may be used alone or in combination of two or more kinds thereof. The content thereof needs to be 1 to 5 parts by mass per 100 parts by mass of the rubber component. The content of the bismaleimide compound falling below 1 part by mass leads to deterioration in physical property, while the content exceeding 5 parts by mass increases the crosslinking density of the rubber, which may lead to deterioration in physical property and durability.

(Other Components)

The vibration-insulating rubber composition of the present invention may further contain oil.

Examples of the oil are not particularly limited, and any of those publicly known may be used. Specific examples of the oil may include: process oil such as aromatic oil, naphthenic oil, and paraffin oil; vegetable oil such as coconut oil; synthetic oil such as alkylbenzene oil; and castor oil. Those examples of the oil may be used alone or in combination of two or more kinds thereof.

Further, the rubber composition of the present invention may contain carbon black as a filler. Examples of the carbon black are not particularly limited, and any of those publicly known may be used as the carbon black. Specific examples thereof may include: SRF, GPF, FEF, FT, MT, and in the present invention, FEF may suitably be used. Those examples of the carbon black may be used alone or in combination of two or more kinds thereof.

Further, in terms of attaining a low dynamic-to-static modulus ratio in the rubber, the carbon black may preferably have an iodine absorption of 10 to 70 g/kg and a DBT oil absorption of 25 to 180 ml/100 g.

Here, the carbon black may be compounded in an amount of 10 to 80 parts by mass per 100 parts by mass of the rubber component, with the objective of attaining a low dynamic-to-static modulus ratio.

Silica may also be compounded as a filler, and silica gel having a nitrogen absorption specific surface area (calculated by the BET method) of 70 to 230 $m^2$/g may suitably be used with the objective of attaining a low dynamic-to-static modulus ratio.

Silica to be used may preferably be compounded in an amount of 10 to 80 parts by mass per 100 parts by mass of the rubber component.

According to the present invention, with the objective of accelerating vulcanization, a vulcanization accelerator such as zinc oxide (ZnO) or fatty acid may be compounded. The fatty acid may be exemplified by any of saturated or unsaturated fatty acid, and straight-chain or branched-chain fatty acid, without being particularly limited in terms of the number of carbon atoms. Specific examples thereof may include fatty acid having 1 to 30 carbon atoms, preferably 15 to 30 carbon atoms, more specifically, cyclohexanoic acid (cyclohexanecarbonic acid), naphthenic acid such as alkyl-cyclopentane having a side chain, saturated fatty acid such as hexanoic acid, octanoic acid, decanoic acid (including branched carbonic acid such as neodecanoic acid), dodecanoic acid, tetradecanoic acid, hexadecanoic acid, and octadecanoic acid (stearic acid), unsaturated fatty acid such as methacylic acid, oleic acid, linoleic acid, and linolenic acid, and resin acid such as rosin, tall oil acid, and abietic acid. Those examples of the fatty acid may be contained alone or in combination of two or more kinds thereof. In the present invention, zinc oxide and stearic acid may suitably used. The content of the vulcanization accelerator aids may preferably be 1 to 15 parts by mass, more preferably 2 to 10 parts by mass per 100 parts by mass of the rubber component.

The rubber composition of the present invention may contain antioxidants. The antioxidants are not particularly limited and any of those publicly known may be used. Examples thereof may include a phenol based antioxidant, an imidazole based antioxidant, and an amine based antioxidant. The content of the antioxidants is generally 0.5 to 10 parts by mass, preferably 1 to 5 parts by mass per 100 parts by mass of the rubber component.

In obtaining the rubber composition of the present invention, there is no specific limitation imposed on a method of compounding the aforementioned components, and all the component materials may be compounded at once to be kneaded, or may be compounded in two stages or three stages to be kneaded.

For the kneading, a kneader such as a roll kneader, an internal mixer, and a Banbury rotor may be used. Further, in the case of forming the rubber composition into a sheet-like shape or a belt shape, a publicly known molder such as an extruder and a press machine may be used.

(Vibration-Insulating Rubber, Vulcanized Rubber Composition)

The vibration-insulating rubber of the present invention has a feature in that the aforementioned vibration-insulating rubber composition or a vulcanized vibration-insulating rubber composition is used.

For example, the vibration-insulating rubber may be manufactured by subjecting the vibration-insulating rubber composition of the present invention to molding process and then to vulcanization process. The vulcanization may be performed under any condition selected as appropriate, and is performed for 5 to 120 minutes at a temperature generally in a range of 140° C. to 180° C., preferably 150° C. to 170° C.

The vibration-insulating rubber of the present invention has excellent basic physical properties, a low dynamic-to-static modulus ratio, and thermal resistance, while being excellent in weather resistance and crack growth resistance, and may be applied for use in a vibration-insulating member. There is no specific limitation on the application of the vibration-insulating member, which may preferably be used for vehicles having markedly high performance requirements, particularly in as a vibration-insulating member for automobiles.

Examples of the vibration-insulating member for automobiles may include: an engine mount; a torsional damper; a rubber bush; a strut mount; a bound bumper; helper rubber; a member mount; a stabilizer bush; an air spring; a center support; a rubber-containing propeller shaft; a vibration-insulating lever; a companion damper; dumping rubber; idler arm bush; a steering column bush; coupling rubber; a body mount; a muffler support; a dynamic damper; and piping rubber. Of those, the vibration-insulating rubber may particularly be suited for use in an engine mount. Further, the vibration rubber may suitably be used for a center support which is required to have weather resistance.

EXAMPLES

In the following, the present invention is described in detail below with reference to Examples. However, the present invention is no way limited to Examples in below.

Examples 1 to 11 and Comparative Examples 1 to 4

Components of Table 1 were mixed at the compounding ratios shown therein and kneaded, so as to prepare rubber compositions to be used as samples.

The method of preparing EBR shown in Table 1 is illustrated in below.

(Preparation of Ethylene-Butadiene Copolymer (EBR1))

A toluene solution of 160 mL was added to a 400 mL pressure-resistant glass reactor that had been sufficiently dried, and then ethylene was introduced thereinto at 0.8 MPa. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 µmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 µmol of gadolinium equivalent to the monomer solution, which was then subjected to polymerization at room temperature for 5 minutes. Thereafter, 100 mL of a toluene solution containing 15.23 g (0.28 mol) of 1,3-butadiene was added while reducing the introduction pressure of ethylene at a rate of 0.2 MPa/min, and then polymerization was further performed for another 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer (EBR1, a block copolymer). The yield of the EBR1 thus obtained was 12.50 g.

The EBR1 thus obtained was subjected to measurement and analysis by the following method so as to investigate of the microstructure, the ethylene content, the weight-average molecular weight (Mw), the molecular weight distribution (Mw/Mn), block polyethylene melting temperature (DSC peak temperature), and the chain structure. The measurement results are shown in Table 2.

(Preparation of Ethylene-Butadiene Copolymer (EBR2))

A toluene solution of 100 mL was added to a 400 mL pressure-resistant glass reactor that had been sufficiently dried, and then ethylene was introduced thereinto at 0.8 MPa. Meanwhile, in a glovebox under a nitrogen atmosphere, 28.5 µmol of bis(2-phenylindenyl)gadolinium bis(dimethylsilylamide) [(2-PhC$_9$H$_6$)$_2$GdN(SiHMe$_2$)$_2$], 34.2 µmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 µmol of gadolinium equivalent to the monomer solution, which was then subjected to polymerization at room temperature for 5 minutes. Thereafter, 30 mL of a toluene solution containing 4.57 g (0.085 mol) of 1,3-butadiene was added while reducing the introduction pressure of ethylene at a rate of 0.2 MPa/min, and then polymerization was further performed for another 60 minutes. Next, the following operation was repeated three times in total: "the introduction pressure of ethylene was restored to 0.8 MPa and polymerization was performed for 5 minutes. Thereafter, 30 mL of a toluene solution containing 4.57 g (0.085 mol) of 1,3-butadiene was added while reducing the introduction pressure of ethylene at a rate of 0.2 MPa/min, and then polymerization was further performed for another 60 minutes". After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer (EBR2, a multiblock copolymer). The yield of the EBR2 thus obtained was 14.00 g.

The EBR2 thus obtained was subjected to measurement and analysis by the following method so as to investigate the microstructure, the ethylene content, the weight-average molecular weight (Mw), the molecular weight distribution (Mw/Mn), the block polyethylene melting temperature (DSC peak temperature), and the chain structure. The measurement results are shown in Table 2.

(Preparation of Ethylene-Butadiene Copolymer (EBR3))

Toluene of 150 mL was added to a 2 L stainless reactor that had been sufficiently dried, and then ethylene was introduced thereinto at 0.8 MPa. Meanwhile, in a glovebox under a nitrogen atmosphere, 14.5 µmol of bis(2-phenylindenyl)gadolinium bis(dimethylsilylamide) [(2-PhC$_9$H$_6$)$_2$GdN(SiHMe$_2$)$_2$], 14.1 µmol of dimethylanilinium tetrakis(pentafluorophenyl)borate [Me$_2$NHPhB(C$_6$F$_5$)$_4$], and 0.87 mmol of diisobutylaluminum hydride were provided in a glass container, which was dissolved into 5 mL of toluene, to thereby obtain a catalyst solution. After that, the catalyst solution was taken out from the glovebox and added by 14.1 µmol of gadolinium equivalent to the monomer solution, which was then subjected to polymerization at 50° C. for 5 minutes. Thereafter, 20 mL of a toluene solution containing 3.05 g (0.056 mol) of 1,3-butadiene was added while reducing the introduction pressure of ethylene at a rate of 0.2 MPa/min, and then polymerization was further performed for another 15 minutes. Next, the following operation was repeated three times in total: "the introduction pressure of ethylene was restored to 0.8 MPa and polymerization was performed for 5 minutes. Thereafter, 40 mL of a toluene solution containing 6.09 g (0.113 mol) of 1,3-butadiene was added while reducing the introduction pressure of ethylene at a rate of 0.2 MPa/min, and then polymerization was further performed for another 30 minutes". After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer (EBR3, a multiblock copolymer). The yield of the EBR3 thus obtained was 24.50 g.

The EBR3 thus obtained was subjected to measurement and analysis by the following method so as to investigate the microstructure, the ethylene content, the weight-average molecular weight (Mw), the molecular weight distribution (Mw/Mn), the block polyethylene melting temperature (DSC peak temperature), and the chain structure. The measurement results are shown in Table 2.

(Preparation of Ethylene-Butadiene Copolymer (EBR4))

A copolymer (EBR4, a multiblock copolymer) was obtained in the same manner as in the preparation of the EBR3, except in that bis(2-phenylindenyl)gadolinium bis (dimethylsilylamide) [(2-PhC$_9$H$_6$)$_2$GdN(SiHMe$_2$)$_2$] was replaced by bis(2-phenyl-1-methylindenyl)gadolinium bis (dimethylsilylamide) [(2-Ph-1-MeC$_9$H$_5$)$_2$GdN(SiHMe$_2$)$_2$]. The yield of the EBR4 thus obtained was 28.55 g.

The EBR4 thus obtained was subjected to measurement and analysis by the following method so as to investigate the microstructure, the ethylene content, the weight-average molecular weight (Mw), the molecular weight distribution (Mw/Mn), the block polyethylene melting temperature (DSC peak temperature), and the chain structure. The measurement results are shown in Table 2.

The EBR1 to EBR4 were analyzed by the following method.

(1) Microstructure of Copolymer (1,2-Vinyl Bond Content, Cis-1,4 Bond Content)

The microstructure (1,2-vinyl bond content) of the butadiene moiety in the copolymer is determined from an integral ratio of 1,2-vinyl bond component (5.0 ppm to 5.1 ppm) to a butadiene bond component (5 ppm to 5.6 ppm) of the whole, based on $^1$H-NMR spectrum (100° C., d-tetrachloroethane standard: 6 ppm), and the microstructure (cis-1,4 bond content) of the butadiene moiety in the copolymer is determined from an integral ratio of cis-1,4 bond component (26.5 ppm to 27.5 ppm) to a butadiene bond component (26.5 ppm to 27.5 ppm+31.5 ppm to 32.5 ppm) of the whole, based on $^{13}$C-NMR spectrum (100° C., d-tetrachloroethane standard: 73.8 ppm).

(2) Content of Ethylene-Derived Moiety in Copolymer

The content (mol %) of the ethylene-derived moiety in the copolymer is determined from an integral ratio of an ethylene bond component (28.5 ppm to 30.0 ppm) of the whole to a butadiene bond component (26.5 ppm to 27.5 ppm+31.5 ppm to 32.5 ppm) of the whole, based on $^{13}$C-NMR spectrum (100° C., d-tetrachloroethane standard: 7.38 ppm).

(3) Weight-Average Molecular Weight (Mw) and Molecular Weight Distribution (Mw/Mn) of Copolymer A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

(4) Block Polyethylene Melting Temperature (DSC Peak Temperature) of Copolymer

A DSC curve of each copolymer was obtained by differential scanning calorimetry (DSC) according to JIS K7121-1987, to thereby measure the block polyethylene melting temperature (DSC peak temperature). In the measurement, used as samples were rubber components obtained by immersing each copolymer in a large amount of tetrahydrofuran for 48 hours so as to remove all the components dissolved in the tetrahydrofuran and then by drying the copolymer, in order to eliminate the effect to be produced by impurities such as a homopolymer and a catalyst residue.

(5) Identification of Copolymer

The sequence distribution of the copolymer A was analyzed by applying ozonolysis-GPC measurements disclosed in a document ("Polymer Preprints, Japan, Vol. 42, No. 4, pp. 1347"). A polystyrene equivalent weight-average molecular weight (MW) and molecular weight distribution (Mw/Mn) of each copolymer were obtained through gel permeation chromatography [GPC: HLC-8121GPC/HT (manufactured by Tosoh Corporation), column: two of GPC HT-803 (manufactured by Showa Denko K.K.), detector: differential refractometer (RI)], using monodisperse polystyrene as a reference, at measurement temperature of 140° C.].

<Property Evaluation of Vulcanized Rubber>

The rubber composition samples were each subjected to vulcanization at 160° C. for 10 minutes, which were then evaluated by the following test methods.

(1) Rubber Physical Properties (Hardness (Hs), Tensile Elongation (Eb), Tensile Strength (Tb))

Samples of Examples and Comparative Examples were each measured for hardness Hs (°) according to JIS K6253 (Type A).

Samples of Examples and Comparative Examples were each measured for tensile elongation Eb (%) according to JIS K6251.

Samples of Examples and Comparative Examples were each measured for tensile strength Tb (MPa) according to JIS K6251.

The measured values are shown in Table 1.

(2) Thermal Resistance (Heat-Aging Test)

As to the vulcanized rubber samples obtained as Examples and Comparative Examples, the test pieces were each allowed to stand under the conditions of 100° C. for 500 hours according to JIS K6257, and then measured for tensile elongation (Eb) and tensile strength (Tb), so as to calculate the change rates (%) thereof. The calculated values are shown in Table 2.

(3) Ozone Resistance (Weather Resistance)

The vulcanized rubber samples obtained in Examples and Comparative Examples were cut into test samples each in a size of 20 mm×100 mm×1.0 mm and the surface thereof was washed with acetone. Immediately after being washed, the samples were left in a thermostatic oven having a temperature of 40° C. and an ozone concentration of 50 pphm, while being applied with a dynamic elongation of 0% to 20%, and thereafter the crack state of the samples was judged with naked eye.

The ozone resistance was evaluated as "poor" when the generated crack was so crucial that it may lead to rubber fracture breakage, and evaluated as "good" when fine cracks were all so fine that they are not fatal. The evaluation results are shown in Table 1.

(4) Crack Growth Resistance (Constant Strain)

The vulcanized rubber samples obtained in Examples and Comparative Examples were each made into a test piece No. JIS3, and a crack of 0.5 mm was caused in the center of the test piece. The cracked test piece was repeatedly applied with fatigue at a constant strain of 0 to 100% at 35° C., so as to count the number of times the fatigue was applied before the sample is cut, to thereby evaluate the crack growth resistance.

The evaluation results were indexed with a score of 100 representing the result obtained for Comparative Example 1, and a larger index value means more excellent crack growth resistance crack growth resistance (constant strain). The evaluation results are shown in Table 1.

TABLE 2

|  | EBR1 | EBR2 | EBR3 | EBR4 |
|---|---|---|---|---|
| Chain Structure | block | block | block | block |
| Mw ('1000) | 350 | 283 | 205 | 221 |
| Mw/Mn | 2.20 | 2.80 | 9.15 | 3.13 |
| Vinyl Bond Content (%) | 1.2 | 1.2 | 1.4 | 1.8 |
| Cis-1,4 Bond Content (%) | 98 | 97 | 97 | 97 |
| Ethylene Content (mol %) | 7 | 13 | 34 | 45 |
| Alternating Binding Component | — | — | — | — |
| DSC Peak Temp. | 121 | 121 | 121 | 122 |

It was appreciated from Table 1 that all the samples of Examples each exhibit excellent result in terms of each of the rubber physical properties, the thermal resistance, the weather resistance, and the crack growth resistance. On the other hand, the samples of Comparative Examples were found to exhibit inferior result in terms of at least one of the aforementioned evaluation items, as compared with the samples of Examples.

INDUSTRIAL APPLICABILITY

According to the present invention, there may be provided a vibration-insulating rubber composition and a crosslinked

TABLE 1

|  |  | Example |  |  |  |  |  |  |  |  |  |  | Comparative Example |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 |
| Chemical Component (parts by mass) | Natural Rubber *1 | 70 | 90 | — | 70 | 70 | 70 | 70 | 70 | 70 | 70 | 70 | 100 | 70 | 70 | 70 |
|  | EBR1 | 30 | 10 | 100 | 30 | 30 | 30 | 30 | 30 | — | — | — | — | 30 | 30 | 30 |
|  | EBR2 | 30 | 10 | 100 | 30 | 30 | 30 | 30 | — | 30 | — | — | — | 30 | 30 | 30 |
|  | EBR3 | 30 | 10 | 100 | 30 | 30 | 30 | 30 | — | — | 30 | — | — | 30 | 30 | 30 |
|  | EBR4 | 30 | 10 | 100 | 30 | 30 | 30 | 30 | — | — | — | 30 | — | 30 | 30 | 30 |
|  | Carbon Black A *2 | 30 | 30 | 30 | 30 | — | — | 15 | 30 | 30 | 30 | 30 | 30 | 30 | 30 | 30 |
|  | Carbon Black B *3 | — | — | — | — | 40 | — | — | — | — | — | — | — | — | — | — |
|  | Carbon Black C *4 | — | — | — | — | — | 30 | — | — | — | — | — | — | — | — | — |
|  | Silica *5 | — | — | — | — | — | — | 15 | — | — | — | — | — | — | — | — |
|  | Silane Coupling Agent *6 | — | — | — | — | — | — | 1.5 | — | — | — | — | — | — | — | — |
|  | Naphthenic Oil *7 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
|  | Stearic Acid | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
|  | Zinc Oxide | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
|  | WAX *8 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
|  | Antioxidizer A *9 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
|  | Antioxidizer B *10 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
|  | Sulfur | 0.4 | 0.4 | 0.4 | 0.4 | 0.4 | 0.4 | 0.4 | 0.2 | 0.4 | 0.4 | 0.4 | 0.4 | 0.7 | 0.4 | 0.4 |
|  | Crosslinking Agent A-1 *11 | 2.0 | 2.0 | 2.0 | — | 2.0 | 2.0 | 2.0 | 2.0 | 2.0 | 2.0 | 2.0 | 2.0 | 2.0 | — | 6.0 |
|  | Crosslinking Agent A-2 *12 | — | — | — | 2.0 | — | — | — | — | — | — | — | — | — | — | — |
|  | Vulcanization Accelerator *13 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Physical Properties of Rubber | Rubber Hardness Hs (°) | 55 | 52 | 60 | 55 | 54 | 57 | 55 | 54 | 55 | 56 | 57 | 51 | 58 | 53 | 59 |
|  | Eb (%) | 560 | 600 | 460 | 570 | 540 | 550 | 570 | 600 | 550 | 540 | 530 | 610 | 500 | 600 | 480 |
|  | Tb (Mpa) | 26 | 25.5 | 25.3 | 26.4 | 26.6 | 28.0 | 29 | 24.3 | 26.2 | 25.8 | 25.4 | 23.9 | 28.3 | 27.6 | 22.9 |
| Heat Resistance | Eb Change Rate (%) | −18 | −20 | −11 | −20 | −23 | −20 | −19 | −13 | −16 | −15 | −15 | −25 | −40 | −31 | −13 |
|  | Tb Change Rate (%) | −24 | −27 | −16 | −28 | −35 | −30 | −27 | −18 | −21 | −19 | −20 | −35 | −52 | −42 | −18 |
| Weather Resistance |  | good | good | good | good | good | good | good | good | good | good | good | poor | good | good | good |
| Crack Growth Resistance |  | 121 | 110 | 170 | 120 | 115 | 133 | 139 | 135 | 124 | 128 | 126 | 100 | 105 | 136 | 92 |

*1: "RSS #1"
*2: N550; FEF, the iodine absorption = 43 g/kg, the DBP oil absorption = 121 ml/100 g, manufactured by ASAHI CARBON CO., LTD.
*3: N880; FT, the iodine absorption = 27 g/kg, the DBP oil absorption = 28 ml/100 g, manufactured by ASAHI CARBON CO., LTD.
*4: N330; HAF, the iodine absorption = 82 g/kg, the DBP oil aborption = 102 ml/100 g, manufactured by ASAHI CARBON CO., LTD.
*5: Precipitated Silica, "NIPSIL VN3" manufactured by Tosoh Silica Corporation
*6: (3-triethoxysilylpropyl)tetrasulfide manufactured by Evonic Degussa Corporation
*7: "Diana Process Oil NS-100" manufactured by Idemitsu Kosan Co., Ltd.
*8: "Antilux 654" manufactured by Rhein Chemie Corp.
*9: 2,2,4-trimethyl-1,2-dihydroquinoline copolymer, "NOCRAC 224" manufactured by OUCHI SHINKO CHEMICAL INDUSTRIAL CO., LTD.
*10: N-phenyl-N'-(1,3-dimethylbutyl)-p-phenylenediamine, "NOCRAC 6C" manufactured by OUCHI SHINKO CHEMICAL INDUSTRIAL CO., LTD.
*11: N,N'-m-phenylenebismaleimide, "VULNOC PM" manufactured by OUCHI SHINKO CHEMICAL INDUSTRIAL CO., LTD.
*12: N,N'-(4,4-diphenylmethane)bismaleimide, "BMI-RB" manufactured by Daiwa Kasei Co., Ltd.
*13 N-cyclohexyl-2-benzothiazyl sulphenamide (CBS)

vibration-insulating rubber composition which successfully maintain basic physical properties and thermal resistance while being excellent in weather resistance and crack growth resistance. A vibration-insulating rubber using the vibration-insulating rubber composition or the crosslinked vibration-insulating rubber composition may suitably be applied as a material for constituting a torsional damper, an engine mount, and a muffler hanger.

The invention claimed is:

1. A vibration-insulating rubber composition, comprising:
   a rubber component having a conjugated diene compound/non-conjugated olefin copolymer;
   sulfur by 0.6 parts by mass or less per 100 parts by mass of the rubber component; and
   a bismaleimide compound by 1 to 5 parts by mass per 100 parts by mass of the rubber component, wherein an amount of cis-1,4 bonds in the moiety derived from the conjugated diene compound is more than 92%.

2. The vibration-insulating rubber composition according to claim 1, wherein the rubber component contains a conjugated diene-based polymer.

3. The vibration-insulating rubber composition according to claim 2, wherein the conjugated diene-based polymer has natural rubber.

4. The vibration-insulating rubber composition according to claim 1, wherein the conjugated diene compound/non-conjugated olefin copolymer contains a moiety derived from a conjugated diene compound by 30 mol % to 80 mol %.

5. The vibration-insulating rubber composition according to claim 1, wherein the conjugated diene compound/non-conjugated olefin copolymer has a polystyrene equivalent weight-average molecular weight of 10,000 to 10,000,000.

6. The vibration-insulating rubber composition according to claim 1, wherein the conjugated diene compound/non-conjugated olefin copolymer has a molecular weight distribution (Mw/Mn) of 10 or less.

7. The vibration-insulating rubber composition according to claim 1, wherein the conjugated diene compound/non-conjugated olefin copolymer is contained by 10 to 100 parts by mass per 100 parts by mass of the rubber component.

8. The vibration-insulating rubber composition according to claim 1, wherein the non-conjugated olefin is acyclic olefin.

9. The vibration-insulating rubber composition according to claim 8, wherein the non-conjugated olefin is at least one selected from a group consisting of ethylene, propylene, and 1-butene.

10. The vibration-insulating rubber composition according to claim 9, wherein the non-conjugated olefin is ethylene.

11. The vibration-insulating rubber composition according to claim 1, wherein the non-conjugated olefin has 2 to 10 carbon atoms.

12. The vibration-insulating rubber composition according to claim 1, wherein the conjugated diene compound/non-conjugated olefin copolymer is block copolymer.

13. The vibration-insulating rubber composition according to claim 1, wherein the conjugated diene compound/non-conjugated olefin copolymer is butadiene/ethylene block copolymer.

14. A crosslinked vibration-insulating rubber composition obtained by crosslinking the vibration-insulating rubber composition according to claim 1.

15. A vibration-insulating rubber product comprising the vibration-insulating rubber composition according to claim 1.

* * * * *